United States Patent
Hirohata et al.

(10) Patent No.: US 10,366,706 B2
(45) Date of Patent: Jul. 30, 2019

(54) SIGNAL PROCESSING APPARATUS, SIGNAL PROCESSING METHOD AND LABELING APPARATUS

(71) Applicant: KABUSHIKI KAISHA TOSHIBA, Minato-ku, Tokyo (JP)

(72) Inventors: Makoto Hirohata, Kawasaki Kanagawa (JP); Toru Taniguchi, Yokohama Kanagawa (JP); Taro Masuda, Kawasaki Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/702,344

(22) Filed: Sep. 12, 2017

(65) Prior Publication Data
US 2018/0277141 A1  Sep. 27, 2018

(30) Foreign Application Priority Data
Mar. 21, 2017  (JP) ................ 2017-054936

(51) Int. Cl.
*G10L 21/02* (2013.01)
*G10L 21/0308* (2013.01)
(Continued)

(52) U.S. Cl.
CPC .......... *G10L 21/0308* (2013.01); *G01S 3/80* (2013.01); *G10L 21/0208* (2013.01);
(Continued)

(58) Field of Classification Search
CPC . G10L 21/0272; G10L 21/0208; G10L 15/30; G10L 19/00; G10L 19/008;
(Continued)

(56) References Cited

U.S. PATENT DOCUMENTS 7,366,662 B2 * 4/2008 Visser ................ G10L 21/0208
704/227
8,880,395 B2 * 11/2014 Yoo .................... G10L 21/0272
704/226
(Continued)

FOREIGN PATENT DOCUMENTS

JP  2007-215163 A  8/2007
JP  2008-039693 A  2/2008
(Continued)

OTHER PUBLICATIONS

U.S. Appl. No. 15/705,165, filed Sep. 14, 2017, Masuda et al.
(Continued)

*Primary Examiner* — Vijay B Chawan
(74) *Attorney, Agent, or Firm* — Knobbe, Martens, Olson & Bear, LLP (57) ABSTRACT

According to one embodiment, a signal processing apparatus includes a processer. The processor separates a plurality of signals, which are received at different positions and come from different directions, by a separation filter. The processor estimates incoming directions of a plurality of separate signals respectively, and associates the plurality of separate signals with transmission sources of the plurality of signals. The processor associates either one of a first attribute and a second attribute with the separate signals which are associated with the transmission sources of the signals based on results of the estimation of the incoming directions in a first period, and add either one of first label information and second label information.

13 Claims, 6 Drawing Sheets

(51) Int. Cl.
*G10L 25/51* (2013.01)
*G10L 21/0208* (2013.01)
*G01S 3/80* (2006.01)
*G10L 25/78* (2013.01)
*G10L 21/0272* (2013.01)

(52) U.S. Cl.
CPC .......... *G10L 25/51* (2013.01); *G10L 21/0272* (2013.01); *G10L 25/78* (2013.01)

(58) Field of Classification Search
CPC ........... G10L 25/78; G10L 2021/02161; G10L 21/0264; H04R 2430/25; H04R 1/1083; H04R 2201/021; H04R 2227/001; H04R 2499/13; H04R 7/045; H03H 2021/0034; H03H 21/0012; H03H 21/0029
USPC .... 704/201, 227, 203, 226, 500; 381/56, 86, 381/92
See application file for complete search history.

(56) References Cited

U.S. PATENT DOCUMENTS

| | | | | |
|---|---|---|---|---|
| 8,886,526 | B2* | 11/2014 | Yoo | G10L 21/0272 704/226 |
| 9,093,078 | B2* | 7/2015 | Hacihabiboglu | G10L 21/0272 |
| 2001/0037195 | A1* | 11/2001 | Acero | G10L 25/78 704/200 |
| 2003/0112983 | A1* | 6/2003 | Rosca | G06K 9/624 381/103 |
| 2004/0068370 | A1* | 4/2004 | Moody | G01C 21/36 701/469 |
| 2005/0060142 | A1* | 3/2005 | Visser | G10L 21/0208 704/201 |
| 2005/0240642 | A1* | 10/2005 | Parra | G06K 9/6243 708/400 |
| 2006/0034467 | A1* | 2/2006 | Sleboda | H04R 5/02 381/86 |
| 2006/0206315 | A1* | 9/2006 | Hiroe | H04R 3/005 704/203 |
| 2007/0038442 | A1* | 2/2007 | Visser | G10L 21/0208 704/233 |
| 2008/0201138 | A1* | 8/2008 | Visser | G10L 21/0208 704/227 |
| 2013/0294608 | A1* | 11/2013 | Yoo | G10L 21/0272 381/56 |
| 2013/0297296 | A1* | 11/2013 | Yoo | G10L 21/0272 704/203 |
| 2013/0297298 | A1* | 11/2013 | Yoo | G10L 21/0272 704/205 |
| 2014/0058736 | A1* | 2/2014 | Taniguchi | G10L 19/00 704/500 |
| 2016/0219024 | A1* | 7/2016 | Verzun | H04L 63/102 |
| 2017/0053662 | A1 | 2/2017 | Nakadai et al. | |
| 2018/0277140 | A1 | 9/2018 | Masuda et al. | |

FOREIGN PATENT DOCUMENTS

| | | |
|---|---|---|
| JP | 5117012 B2 | 1/2013 |
| JP | 2014-041308 A | 3/2014 |
| JP | 2014-048399 A | 3/2014 |
| JP | 6005443 B2 | 10/2016 |
| JP | 2017-040794 A | 2/2017 |
| JP | 2018-156052 A | 10/2018 |

OTHER PUBLICATIONS

Bello, J.P., et al., "A Tutorial on Onset Detection in Music Signals", IEEE Transactions on Speech and Audio Processing, vol. 13, No. 5, Sep. 2005, pp. 1035-1047.

Ono, N., et al., "Acoustic Signal Processing Based on Asynchronous and Distributed Microphone Array", The Journal of the Acoustical Society of Japan, vol. 70, No. 7, Jul. 2014, pp. 391-396.

Schmidt, R.O., "Multiple Emitter Location and Signal Parameter Estimation", IEEE Transactions on Antennas and Propagation, vol. AP-34, No. 3, Mar. 1986, pp. 276-280.

Swain, M.J., et al., "Color Indexing", International Journal of Computer Vision, vol. 7, No. 1, Nov. 1991, pp. 11-32.

* cited by examiner

SIGNAL PROCESSING APPARATUS, SIGNAL PROCESSING METHOD AND LABELING APPARATUS

CROSS-REFERENCE TO RELATED APPLICATIONS

This application is based upon and claims the benefit of priority from Japanese Patent Application No. 2017-054936, filed Mar. 21, 2017, the entire contents of which are incorporated herein by reference.

FIELD

Embodiments described herein relate generally to a signal processing apparatus, a signal processing method and a labeling apparatus.

BACKGROUND

Recently, an activity of collecting and analyzing customer's voices for business improvement, etc., which is referred to as VOC (voice of the customer) etc., has been widely performed. Further, in connection with such a situation, various audio collection technologies have been proposed.

DETAILED DESCRIPTION

In general, according to one embodiment, a signal processing apparatus includes a memory and a processer electrically coupled to the memory. The processor is configured to: separate a plurality of signals by a separation filter, and output a plurality of separate signals, the plurality of signals including signals which are received at different positions and come from different directions; estimate incoming directions of the plurality of separate signals, respectively, and associate the plurality of separate signals with transmission sources of the plurality of signals; and associate either one of a first attribute and a second attribute with the separate signals which are associated with the transmission sources of the signals, based on results of the estimation of the incoming directions in a first period, and add either one of first label information indicative of the first attribute and second label information indicative of the second attribute.

An embodiment will be described hereinafter with reference to the accompanying drawings.

Figure 1:
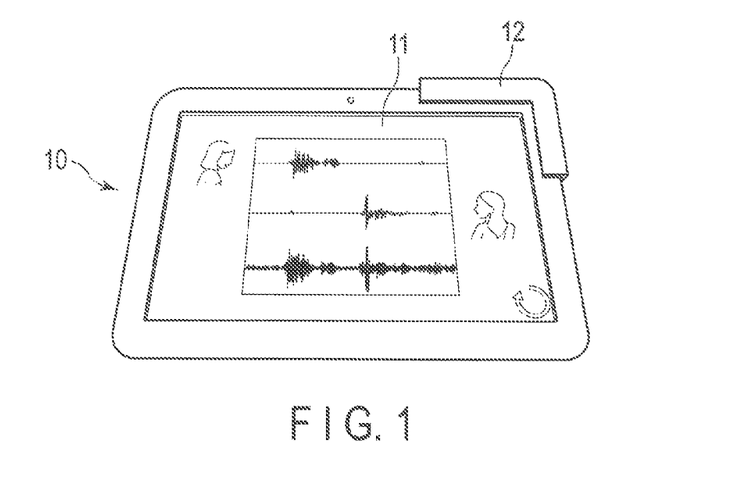
FIG. 1 is a diagram showing an example of the exterior appearance of a signal processing apparatus of an embodiment.

FIG. 1 is a diagram showing an example of the exterior appearance of a signal processing apparatus of the embodiment.

A signal processing apparatus 10 is realized, for example, as an electronic device which receives a touch operation with a finger or a pen (stylus) on a display screen. For example, the signal processing apparatus 10 may be realized as a tablet computer, a smartphone, etc. Note that the signal processing apparatus 10 receives not only a touch operation on the display screen but also, for example, operations of a keyboard and a pointing device which are externally connected, an operation button which is provided in the peripheral wall of the housing, etc. Here, it is assumed that the signal processing apparatus 10 receives a touch operation on the display screen, but the capability of receiving the touch operation on the display device is not prerequisite for this signal processing apparatus 10, and this signal processing apparatus 10 may only receive, for example, the operations of the keyboard, the pointing device, the operation button, etc.

As shown in FIG. 1, the signal processing apparatus 10 includes a touchscreen display 11. The signal processing apparatus 10 has, for example, a slate-like housing, and the touchscreen display 11 is arranged, for example, on the upper surface of the housing. The touchscreen display 11 includes a flat panel display and a sensor. The sensor detects a contact position of a finger or a pen on the screen of the flat panel display. The flat panel display is, for example, a liquid crystal display (LCD), etc. The sensor is, for example, a capacitive touch panel, an electromagnetic induction-type digitizer, etc. Here, it is assumed that the touchscreen display 11 includes both the touch panel and the digitizer.

Further, the signal processing apparatus 10 includes an audio input terminal which is not shown in FIG. 1, and is connectable to an audio input device (microphone array) 12 via the audio input terminal. The audio input device 12 includes a plurality of microphones. Further, the audio input device 12 has such a shape that the audio input device 12 can be detachably attached to one corner of the housing of the signal processing apparatus 10. FIG. 1 shows a state where the audio input device 12 connected to the signal processing apparatus 10 via the audio input terminal is attached to one corner of the main body of the signal processing apparatus 10. Note that the audio input device 12 is not necessarily formed in this shape. The audio input device 12 may be any device as long as the signal processing apparatus 10 can acquire sounds from a plurality of microphones, and for example, the audio input device 12 may be connected to the signal processing apparatus 10 via communication.

Figure 2:
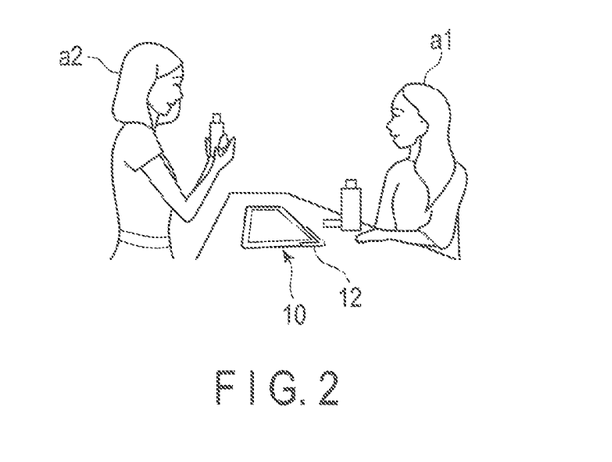
FIG. 2 is a diagram showing an example of the scene using the signal processing apparatus of the embodiment.

FIG. 2 is a diagram showing an example of the scene using the signal processing apparatus 10.

The signal processing apparatus 10 may be applied, for example, as an audio collection system designed for VOC, etc. FIG. 2 shows a situation where voices in the conversation between staff a2 and a customer a1 are collected by the audio input device 12 connected to the signal processing apparatus 10. The collected voices are separated into the speakers (the staff a2 and the customer a1) by the signal processing apparatus 10, and for example, the voice of the staff a2 is used for improving the manual of service to customers, and the voice of the customer a1 is used for understanding the needs of customers. The separation of the collected voices into the speakers will be described later in detail.

In the meantime, for example, to differentiate between the voice of the staff a2 and the voice of the customer a1 which have been separated, preliminary registration of the voice of the staff a2, preliminary setup of the positional relationship between the staff a2 and the customer a1, etc., are required, but these may reduce usability.

In light of this, the signal processing apparatus 10 is configured to differentiate the voice of a specific speaker (one of the staff a2 and the customer a1) and the voice of a nonspecific speaker (the other one of the staff a2 and the customer a1) without requiring, for example, a troublesome preliminary setup, etc., and this point will be described below.

Figure 3:
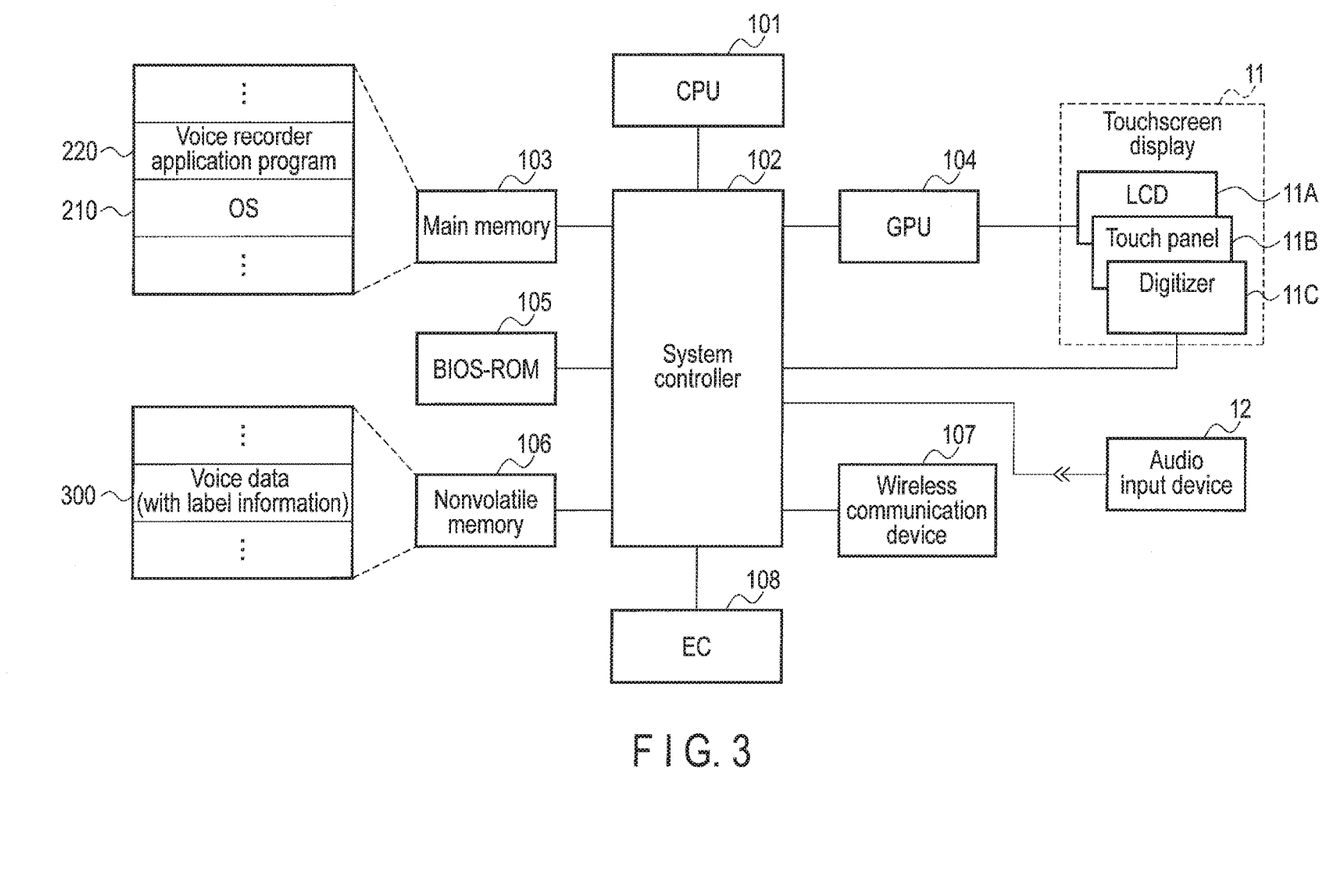
FIG. 3 is a diagram showing an example of the hardware structure of the signal processing apparatus of the embodiment.

FIG. 3 is a diagram showing an example of the hardware structure of the signal processing apparatus 10.

As shown in FIG. 3, the signal processing apparatus 10 includes a central processing unit (CPU) 101, a system controller 102, a main memory 103, a graphics processing unit (GPU) 104, a basic input/output system (BIOS) ROM 105, a nonvolatile memory 106, a wireless communication device 107, an embedded controller (EC) 108, etc.

The CPU 101 is a processor which controls the operations of various components in the signal processing apparatus 10. The CPU 101 loads various programs from the nonvolatile memory 106 into the main memory 103 and executes these programs. The programs include an operating system (OS) 210 and various application programs including a voice recorder application program 220. Although the voice recorder application program 220 will be described later in detail, the voice recorder application program 220 has the function of separating voices collected by the audio input device 12 into speakers, adding label information indicating whether the speaker is a specific speaker or a nonspecific speaker, and storing in the nonvolatile memory 106 as voice data 300. Further, the CPU 101 also executes a BIOS stored in the BIOS ROM 105. The BIOS is a program responsible for hardware control.

The system controller 102 is a device which connects the local bus of the CPU 101 and the components. In the system controller 102, a memory controller which performs access control of the main memory 103 is also incorporated. Further, the system controller 102 also has the function of performing communication with the GPU 104 via a serial bus of a PCIe standard, etc. Still further, the system controller 102 also has the function of inputting sounds from the above-described audio input device 12 connected via the audio input terminal.

The CPU 104 is a display processor which controls an LCD 11A incorporated in the touchscreen display 11. The LCD 11A displays a screen image based on a display signal generated by the CPU 104. A touch panel 11B is arranged on the upper surface side of the LCD 11A, and a digitizer 11C is arranged on the lower surface side of the LCD 11A. The contact position of a finger on the screen of the LCD 11A, the movement of the contact position, etc., are detected by the touch panel 11B. Further, the contact position of a pen (stylus) on the screen of LCD 11A, the movement of the contact position, etc., are detected by the digitizer 11C.

The wireless communication device 107 is a device configured to perform wireless communication. The EC 108 is a single-chip microcomputer including an embedded controller responsible for power management. The EC 108 has the function of turning on or turning off the signal processing apparatus 10 according to the operation of a power switch. Further, the EC 108 includes a keyboard controller which receives the operations of the keyboard, the pointing device, the operation button, etc.

Figure 4:
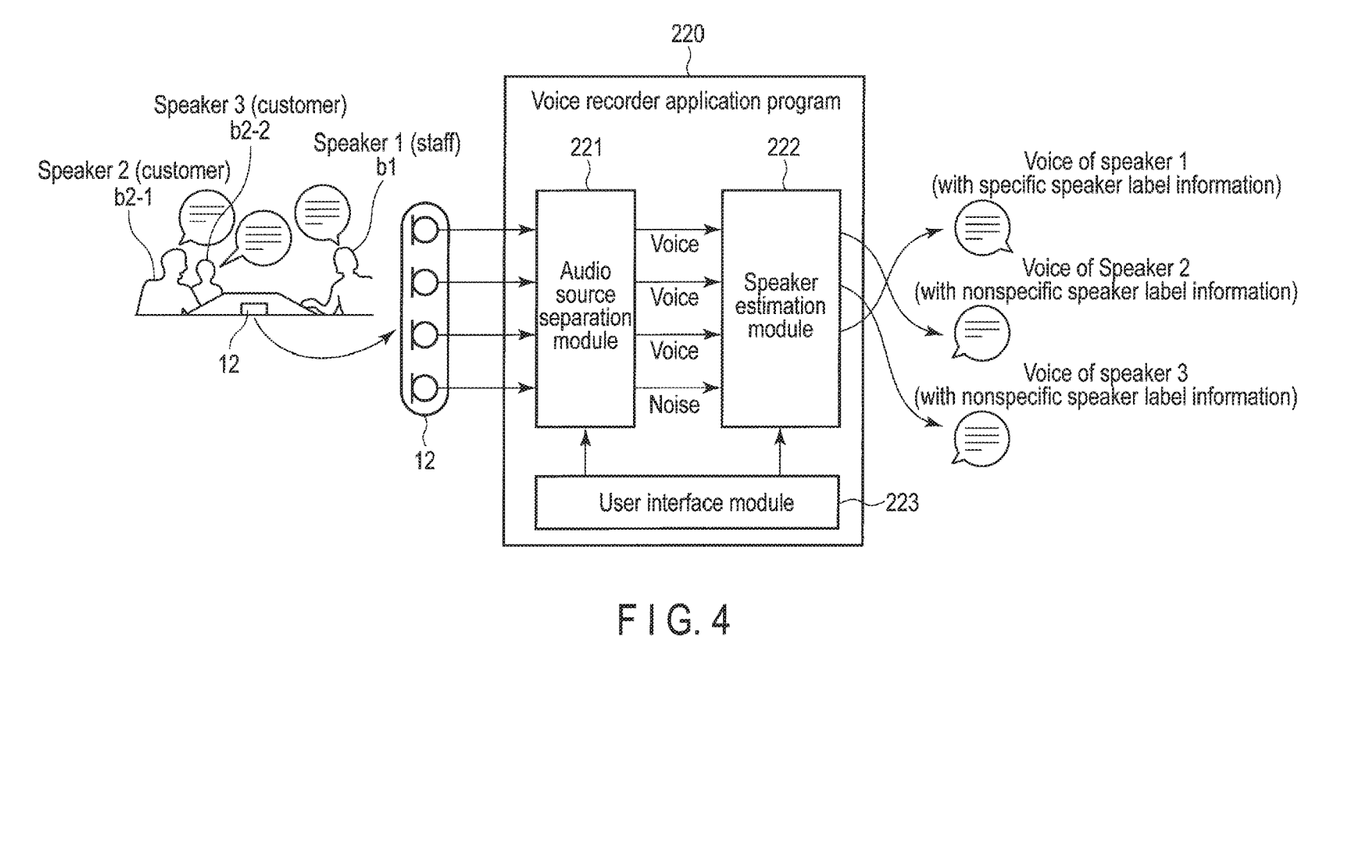
FIG. 4 is a diagram showing a structural example of the functional block of a voice recorder application program of the embodiment.

FIG. 4 is a diagram showing an example of the functional block of the voice recorder application program 220 which operates on the signal processing apparatus 10 of the above-described hardware structure.

As shown in FIG. 4, the voice recorder application program 220 includes an audio source separation module 221, a speaker estimation module 222, a user interface module 223, etc. Here, it is assumed that the voice recorder application program 220 is executed by being loaded from the nonvolatile memory 106 into the main memory 103 by the CPU 101. In other words, it is assumed that the processing portions of the audio source separation module 221, the speaker estimation module 222 and the user interface module 223 are realized by executing a program by a processor. Although only one CPU 101 is shown in FIG. 3, the processing portions may be realized by a plurality of processors. Further, the processing portions are not necessarily realized by executing a program by a processor but may be realized, for example, by a special electronic circuit.

Now, a scene where voices in the conversation among three people, namely, a speaker 1 (b1) who is staff and a speaker 2 (b2-1) and a speaker 3 (b2-2) who are customers are collected by the audio input device 12 is assumed.

As described above, the audio input device 12 includes a plurality of microphones. The audio source separation module 221 inputs a plurality of audio signals from these microphones, separates the audio signals into a plurality of separate signals, and outputs the separate signals. More specifically, the audio source separation module 221 estimates from the audio signals, a separation matrix which is a filter (separation filter) used for separating the audio signals into the signals corresponding to the audio sources, multiplies the audio signals by the separation matrix, and acquires the separate signals. Note that the filter (separation filter) for separating the audio signals into the signals corresponding to the audio sources is not limited to the separation matrix. That is, instead of using the separation matrix, a method of applying a finite impulse response (FIR) filter to audio signals and emphasizing (separate into) signals corresponding to audio sources can be applied.

The speaker estimation module 222 estimates the incoming directions of the separate signals output from the audio source separation module 221, respectively. More specifically, the speaker estimation module 222 calculates the directional characteristic distribution of the separate signals by using the separation matrix estimated by the audio source separation module 221, respectively, and estimates the incoming directions of the separate signals from the directional characteristic distribution, respectively. The directional characteristics are certainty (probability) that a signal comes at a certain angle, and the directional characteristic distribution is distribution acquired from directional characteristics of a wide range of angles. Based on the result of estimation, the speaker estimation module 222 can acquire the number of speakers (audio sources) and the directions of the speakers and can also associate the separate signals with the speakers.

Figure 5:
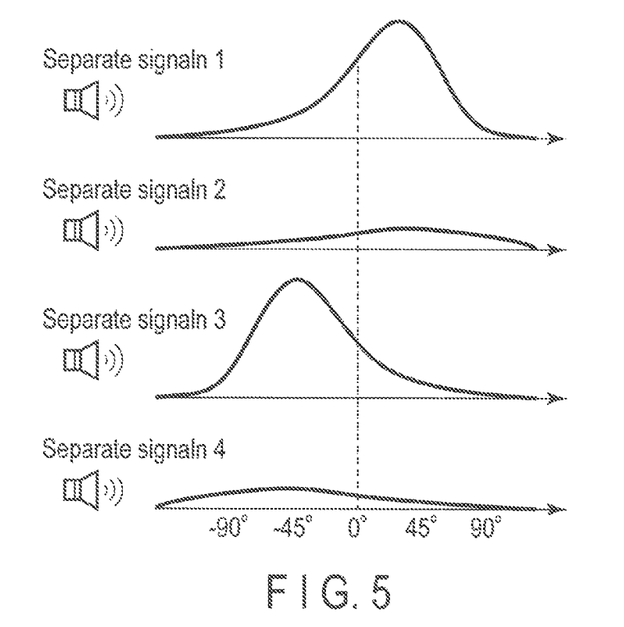
FIG. 5 is a diagram showing an example of directional characteristic distribution of separate signals calculated by the voice recorder application program of the embodiment.

FIG. 5 is a diagram showing an example of the directional characteristic distribution of the separate signals calculated by the speaker estimation module 222.

FIG. 5 shows the directional characteristic distribution of separate signals 1 to 4. Since the separate signals 2 and 4 do not have directional characteristics showing certainty of a predetermined reference value or more, the speaker estimation module 222 determines that the separate signals 2 and 4 are noises. In the separate signal 1, since the directional characteristics at an angle of 45° have a maximum value and have a predetermined reference value or more, the speaker estimation module 222 determines that the separate signal 1 comes at an angle of 45°. In the separate signal 3, since the directional characteristics at an angle of −45° have a maximum value and show certainty of a predetermined reference value or more, the speaker estimation module 222 determines that the separate signal 3 comes at an angle of −45°. In other words, the separate signals 1 and 3 are separate signals whose incoming directions are estimated with certainty of a predetermined reference value or more. As a result of estimation by the speaker estimation module 222, the audio signals (separate signals) of the speakers are respectively stored in the nonvolatile memory 106 as the voice data 300.

Further, based on the result of estimation, the speaker estimation module 222 adds to the separate signal estimated to be the audio signal of the speaker 1 (b1) who is staff, label information indicating that the speaker a specific speaker, and adds to the separate signal estimated to be the audio signal of the speaker 2 (b2-1) or the speaker 3 (b2-2) who is a customer, label information indicating that the speaker is a nonspecific speaker. The association of the speaker 1 (b1) who is staff with a specific speaker and the speaker 2 (b2-1) or the speaker 3 (b2-2) who is a customer with a nonspecific speaker will be described later in detail. By adding the label information in this way, the staff's voice and the customer's voice can be separately handled, and consequently the efficiency of the subsequent processing improves. Note that the customer (the speaker 2 (b2-1) and the speaker 3 (b2-2)) may also be associated with a specific speaker and the staff (speaker 1 (b1)) may also be associated with a nonspecific speaker. That is, the label information is information indicating an attribute of a speaker. The attribute indicates a common quality or feature of ordinary things and people. Further, the attribute here means a specific speaker (one of the staff and the customer) or a nonspecific speaker (the other one of the staff and the customer). For example, in the case of having a meeting, according to the contents of the meeting, a facilitator may be a specific speaker (or a nonspecific speaker) and a participant may be a nonspecific speaker (or a specific speaker).

The user interface module 223 performs an it process of outputting information to the user via the touchscreen display 11 and inputting information from the user via the touchscreen display 11. Note that the user interface module 223 can also input information from a user, for example, via the keyboard, the pointing device, the operation button, etc.

Next, with reference to FIGS. 6 and 7, the general outline of the mechanism by which the signal processing apparatus 10 differentiates between the specific speaker's voice and the nonspecific speaker's voice without requiring, for example, a troublesome preliminary setup, etc., will be described.

Figure 6:
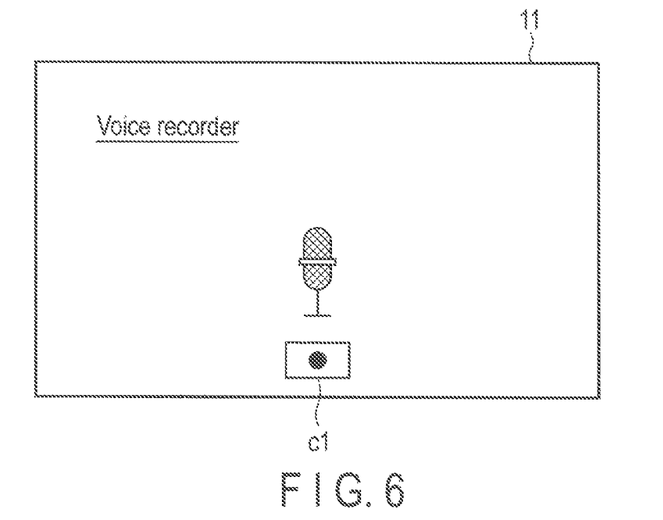
FIG. 6 is a diagram showing an example of the initial screen displayed by the voice recorder application program of the embodiment.

FIG. 6 is a diagram showing an example of the initial screen which the user interface module 223 displays on the touchscreen display 11 when the voice recorder application program 220 is initiated.

In FIG. 6, a reference symbol c1 denotes a recording button for starting audio collection, i.e., recording. If the recording button c1 is operated, the user interface module 223 notifies the start of processing to the audio source separation module 221 and the speaker estimation module 222. In this way, the recording by the voice recorder application program 220 is started. If a touch operation on the touchscreen display 11 corresponds to the display area of the recording button c1, a notification is provided from the OS 210 to the voice recorder application program 220, more specifically, to the user interface module 223, and the user interface module 223 recognizes that the recording button c1 is operated. If a finger, etc., placed on the display area of the recording button c1 is removed from the touchscreen display 11, a notification is also provided from the OS 210 to the user interface module 223, and thus the user interface module 223 recognizes that the operation of the recording button c1 is canceled. The same may be said of buttons other than recording button c1.

Figure 7:
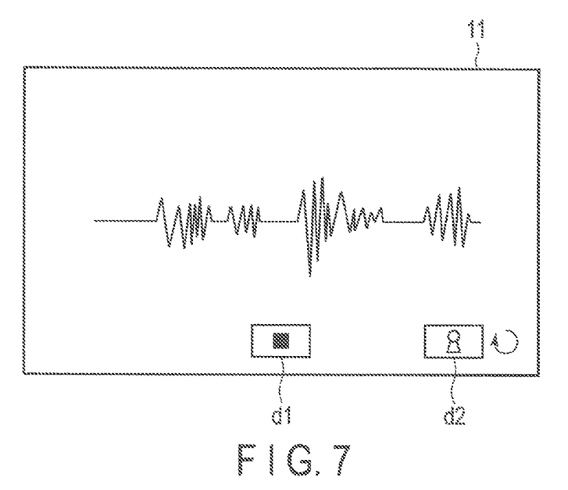
FIG. 7 is a diagram showing an example of the screen during recording displayed by the voice recorder application program of the embodiment.

On the other hand, FIG. 7 is a diagram showing an example of the screen during recording which the user interface module 223 displays on the touchscreen display 11 after the recording is started.

In FIG. 7, a reference symbol d1 denotes a stop button for stopping audio collection, i.e., recording. If the stop button d1 is operated, the user interface module 223 notifies the stop of processing to the audio source separation module 221 and the speaker estimation module 222.

Further, in FIG. 7, the reference symbol d2 denotes a setup button for setting a period for collecting the specific speaker's voice. Hereinafter, the voice collected in this period may be referred to as a learning voice. For example, after the recording is started, the staff takes an opportunity to become the only speaker in the conversation, and during the speech, the staff continuously operates the setup button d2. In this case, a period where the setup button d2 is continuously operated is set as a learning voice collection period. Alternatively, the staff may operate the setup button d2 when the staff starts the speech and may operate the setup button d2 again when the staff ends the speech. In this case, a period from the first operation of the setup button d2 to the second operation of the setup button d2 will be set as the learning voice collection period. Further, the button to be operated at the beginning of a speech and a button to be operated at the end of a speech may be provided, respectively. Still further, the period until certain time elapses after the setup button d2 is operated may be set as the learning voice collection period. Still further, the recording button c1 shown in FIG. 6 may function also as the setup button d2, and the period until certain time elapses after the recording button c1 is operated may be set as the learning voice collection period.

Here, it is assumed that, in the case of setting the learning voice collection period, the setup button d2 is continuously operated.

If the setup button d2 is operated, the user interface module 223 notifies the start of learning voice collection to the speaker estimation module 222. Further, if the operation of the setup button d2 ends, the user interface module 223 also notifies the end of learning voice collection to the speaker estimation module 222.

The speaker estimation module 222 selects a separate signal whose incoming direction is estimated with certainty of a predetermined reference value or more in a period of a predetermined percentage or more of the learning voice collection period, from the plurality of separate signals. The speaker estimation module 222 adds the label information indicating that the speaker is a specific speaker to the selected separate signal. Further, the speaker estimation module 222 adds the label information indicating that the speaker is a nonspecific speaker to the other separate signal. As described above, the positioning as the specific speaker and the nonspecific speaker may be inverted.

Accordingly, in the signal processing apparatus 10, simply by operating the setup button d2 in such a manner that a period where a speech of a specific speaker accounts for a large part of speeches is set as a target period, the specific speaker's voice and the nonspecific speaker's voice can be differentiated from each other. In this way, usability can be improved.

That is, the signal processing apparatus 10 functions as a labeling apparatus which includes a generation module that acquires a plurality of voices from different directions and generates a plurality of separate voices, and a labeling module that adds either one of first label information indicating an attribute of a specific speaker and second label information indicating an attribute of a nonspecific speaker different from the specific speaker to the separate voices based on results of estimation of incoming directions in a first period. Further, the signal processing apparatus 10 functions as a labeling apparatus which further includes a user instruction reception module that instructs the first period and a target for adding the first label information, and the labeling unit adds the first label information according to the user's instruction.

Figure 8:
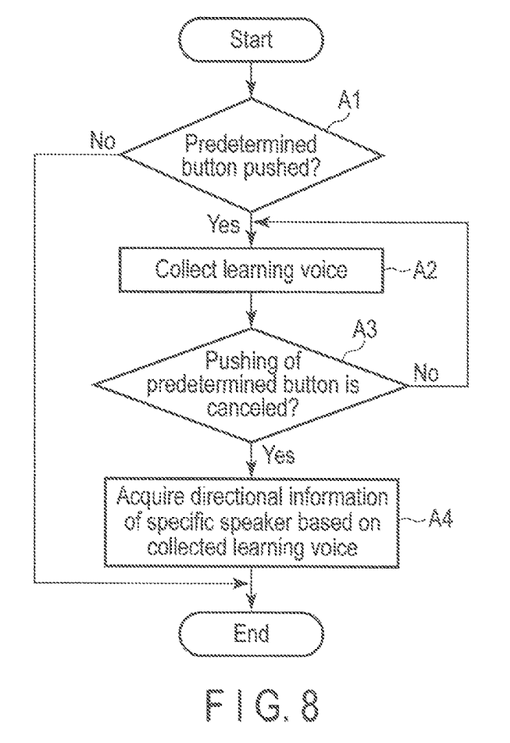
FIG. 8 is a flowchart showing an example of the flow of processing related to differentiation between the voice of a specific speaker and the voice of a nonspecific speaker by the signal processing apparatus of the embodiment.

FIG. 8 is a flowchart showing an example of the flow of processing related to differentiation between the specific speaker's voice and the nonspecific speaker's voice by the signal processing apparatus 10.

If a predetermined button is operated (Step A1; YES), the signal processing apparatus 10 starts learning voice collection (Step A2). The signal processing apparatus 10 continuously performs the learning voice collection of Step A2 while the predetermined button is continuously operated (Step A3; NO).

On the other hand, if the operation of the predetermined button is canceled (Step A3; YES), the signal processing apparatus 10 ends the learning voice collection of Step A2 and acquires directional information of a specific speaker based on the collected learning voice (Step A4). More specifically, a separate signal whose incoming direction is estimated with certainly of a predetermined reference value or more in a period of a predetermined percentage or more of the learning voice collection period is determined to be an audio signal of a specific speaker.

According to this determination, the signal processing apparatus 10 adds the label information indicating that the speaker is a specific speaker to the separate signal determined to be the audio signal of a specific speaker, and adds the label information indicating that the speaker is a nonspecific speaker to the other separate signal.

In the above description, an example where staff who collects voices in the conversation with a customer using the signal processing apparatus 10 takes an opportunity to becomes the only speaker and operates the preset button d2 has been described.

For example, depending on types of business, staff and an employee (who is the user of the signal processing apparatus 10) may have many opportunities to make speeches in some cases, and a customer and a visitor may have many opportunities to make speeches in other cases, at the beginning of conversation. In light of this point, a modification of the differentiation between the specific speaker's voice and the nonspecific speaker's voice without even requiring the operation of the preset button d2 will be further described below.

To avoid the operation of the setup button d2, the user interface module 223 receives a setup of whether a speaker who makes many speeches in a certain period after the recording button c1 is operated and the recording is started is set as a specific speaker or a nonspecific speaker. For example, the user interface module 223 receives a setup of whether a mode is set to a first mode of setting a speaker who makes many speeches in a certain period after the recording button c1 is operated and the recording is started, as a specific speaker, based on the assumption that staff and an employee have many opportunities to make speeches at the beginning of conversation, or a second mode of setting a speaker who makes many speeches in a certain period after the recording button c1 is operated and the recording is started, as a nonspecific speaker, based on the assumption that a customer and a visitor have many opportunities to make speeches at the beginning of conversation. As described above, the positioning as the specific speaker and the nonspecific speaker may be inverted.

If the first mode has been set, the signal processing apparatus 10 performs the learning voice collection for certain time after the recording button c1 is operated and the recording is started, and determines a separate signal whose incoming direction is estimated with certainty of a predetermined reference value or more in a period of a predetermined percentage or more of the collection period, to be an audio signal of a specific speaker.

If the second mode has been set, on the other hand, the signal processing apparatus 10 performs the learning voice collection for certain time after the recording button c1 is operated and the recording is started, and determines a separate signal whose incoming direction is estimated with certainty of a predetermined reference value or more in a period of a predetermined percentage or more of the collection period, to be an audio signal of a nonspecific speaker.

Figure 9:
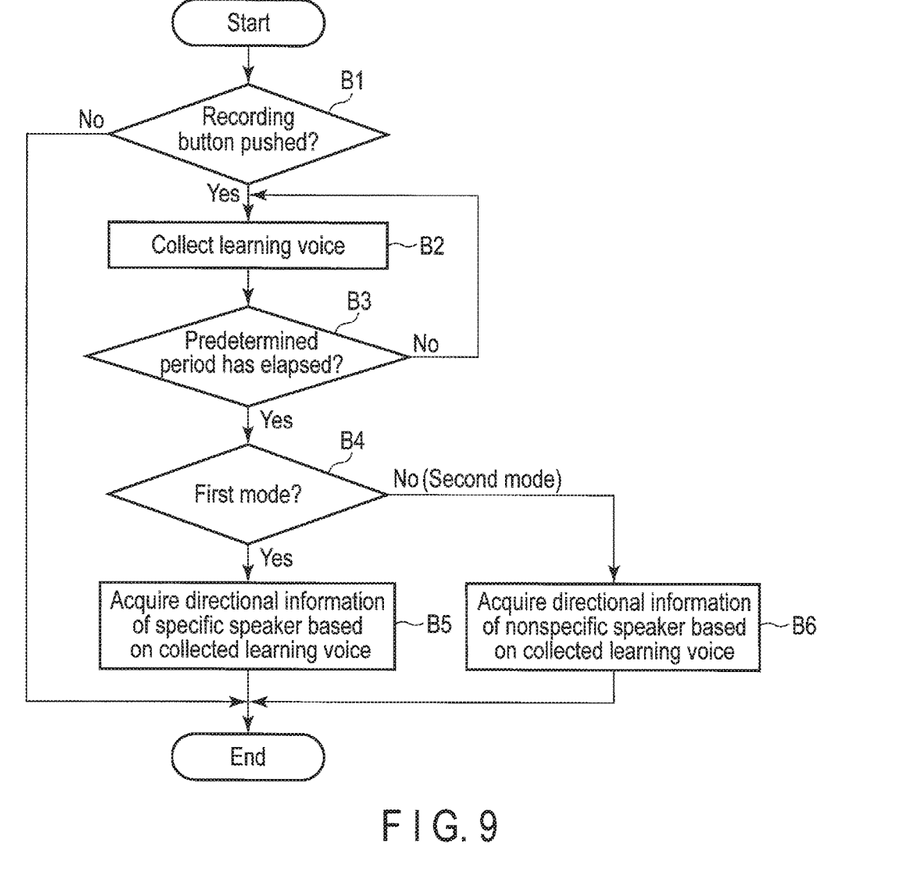
FIG. 9 is a flowchart snowing a modification of the flow of processing related to differentiation between the voice of a specific speaker and the voice of a nonspecific speaker by the signal processing apparatus of the embodiment.

FIG. 9 is a flowchart showing a modification of the flow of processing related to differentiation between the specific speaker's voice and the nonspecific speaker's voice by the signal processing apparatus 10.

When the recording button is operated and the recording is started (Step B1; YES), the signal processing apparatus 10 starts the learning voice collection (Step B2). The signal processing apparatus 10 continues the learning voice collection of Step B2 for a certain period of time. That is, if predetermined time elapses (Step B3; YES), the signal processing apparatus 10 ends the learning voice collection of Step B2.

Next, the signal processing apparatus 10 checks which of the first mode or the second mode has been set (Step B4). If the first mode has been set (Step B4; YES), the signal processing apparatus 10 acquires the directional information of a specific speaker based on the collected learning voice (Step B5). More specifically, a separate signal whose incoming direction is estimated with certainly of a predetermined reference value or more in a period of a predetermined percentage or more of the learning voice collection period is determined to be an audio signal of a specific speaker.

On the other hand, if the second mode has been set (Step B4; NO), the signal processing apparatus 10 acquires the directional information of a nonspecific speaker based on the collected learning voice (step B6). More specifically, a separate signal whose incoming direction is estimated with certainly of a predetermined reference value or more in a period of a predetermined percentage or more of the learning voice collection period is determined to be an audio signal of a nonspecific speaker.

As described above, according to the signal processing apparatus 10, the specific speaker's voice and the nonspecific speaker's voice can be differentiated from each other, for example, without requiring a troublesome preliminary setup, etc.

As the method of differentiating the specific speaker's voice and the nonspecific speaker's voice, for example, a method of providing an audio identification module and estimating a voice (separate signal) where a predetermined keyword is identified in the learning voice collection period which is set in the above-described manner to be the specific speaker's voice may be applied.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

What is claimed is:

1. A signal processing apparatus comprising:
   a memory; and
   a hardware processor electrically coupled to the memory and configured to:
      separate a plurality of signals using a separation filter to obtain a plurality of separate signals, and output the plurality of separate signals, the plurality of signals including signals which come from different directions,
      estimate incoming directions of the plurality of separate signals, respectively, and associate the plurality of separate signals with the incoming directions, and
      associate either one of a first attribute or a second attribute with the separate signals from the plurality of separate signals which are associated with the incoming directions based at least in part on results of the estimation of the incoming directions in a first period, respectively, the first period being set by at least one of button operations.

2. The signal processing apparatus of claim 1, wherein the hardware processor is further configured to associate the first attribute with a signal from the plurality of separate signals whose incoming direction is estimated with a greater than first threshold certainty for at least a first threshold percentage of the first period, and associate the second attribute with the other signals of the plurality of separate signals.

3. The signal processing apparatus of claim 2, wherein the first period comprises a period in which a first button is operated.

4. The signal processing apparatus of claim 2, wherein the first period comprises a period until a first time elapses after a first button is operated.

5. The signal processing apparatus of claim 2, wherein the first period comprises a period from when a first button is operated to when a second button is operated.

6. The signal processing apparatus of claim 2, wherein the first period comprises a period from when a first operation is performed with respect to the first button to when a second operation is performed with respect to the first button.

7. The signal processing apparatus of claim 1, wherein the first period comprises a period in which a first button is operated.

8. The signal processing apparatus of claim 1, wherein the first period comprises a period until a first time elapses after a first button is operated.

9. The signal processing apparatus of claim 1, wherein the first period comprises a period from when a first button is operated to when a second button is operated.

10. The signal processing apparatus of claim 1, wherein the first period comprises a period from when a first operation is performed with respect to the first button to when a second operation is performed with respect to the first button.

11. The signal processing apparatus of claim 1, wherein the hardware processor is further configured to identify the separate signals from the plurality of separate signals as voices, associate the first attribute with a separate signal in which a first signal is identified within the first period, and associate the second attribute with other separate signals from the plurality of separate signals.

12. A signal processing method comprising:
    separating a plurality of signals using a separation filter to obtain a plurality of separate signals, and outputting the plurality of separate signals, the plurality of signals including signals which come from different directions;
    estimating incoming directions of the plurality of separate signals, respectively, and associating the plurality of separate signals with the incoming directions; and
    associating either one of a first attribute or a second attribute with the separate signals from the plurality of separate signals which are associated with the incoming directions based at least in part on results of the estimation of the incoming directions in a first period, respectively, the first period being set by at least one of button operations.

13. An attribute association apparatus comprising:
    a memory; and
    a hardware processor electrically coupled to the memory, and configured to:
    receive a plurality of sounds coming from different directions, and determine a plurality of separate sounds from the plurality of sounds,
    receive at least one of button operations, and
    associate either one of a first attribute indicative of a specific speaker or a second attribute indicative of a nonspecific speaker who is different from the specific speaker with each of the plurality of separate sounds based on results of estimation of incoming directions in a first period which is set by the at least one of button operations.

* * * * *